US011239660B2

(12) United States Patent
Lee

(10) Patent No.: US 11,239,660 B2
(45) Date of Patent: Feb. 1, 2022

(54) DEMAND RESPONSE SYSTEM AND METHOD FOR CONTROLLING DEVICES TO PARTICIPATE IN DEMAND RESPONSE AUTOMATICALLY

(71) Applicant: KOREA ELECTRONICS TECHNOLOGY INSTITUTE, Seongnam-si (KR)

(72) Inventor: Sang Hak Lee, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 109 days.

(21) Appl. No.: 15/976,097

(22) Filed: May 10, 2018

(65) Prior Publication Data
US 2018/0331539 A1    Nov. 15, 2018

(30) Foreign Application Priority Data

May 10, 2017   (KR) .................... 10-2017-0057933

(51) Int. Cl.
| *H02J 3/14* | (2006.01) |
| *G06Q 10/06* | (2012.01) |
| *G06Q 50/06* | (2012.01) |
| *H02J 3/00* | (2006.01) |

(52) U.S. Cl.
CPC .......... *H02J 3/14* (2013.01); *G06Q 10/06315* (2013.01); *G06Q 50/06* (2013.01); *H02J 3/003* (2020.01); *H02J 2203/20* (2020.01); *H02J 2310/14* (2020.01); *H02J 2310/64* (2020.01)

(58) Field of Classification Search
CPC ...... H02J 3/14; G06Q 10/06315; G06Q 50/06
See application file for complete search history.

(56) References Cited

U.S. PATENT DOCUMENTS

| 10,389,115 B2* | 8/2019 | Forbes, Jr. ............. G05B 15/02 |
| 10,436,470 B2* | 10/2019 | Brissette ................. H04W 4/38 |
| 10,768,589 B2* | 9/2020 | Quam .................... H04W 4/021 |
| 2009/0240381 A1* | 9/2009 | Lane ......................... H02J 3/14 |
| | | 700/296 |
| 2010/0289643 A1* | 11/2010 | Trundle ................. G08C 19/16 |
| | | 340/545.1 |

(Continued)

FOREIGN PATENT DOCUMENTS

| JP | 2013-31355 A | 2/2013 |
| KR | 10-2016-0134294 A | 11/2016 |

OTHER PUBLICATIONS

Korean Office Action dated Dec. 22, 2017, in connection with the Korean Patent Application No. 10-2017-0057933.

*Primary Examiner* — Vincent H Tran
(74) *Attorney, Agent, or Firm* — Hauptman Ham, LLP

(57) ABSTRACT

A demand response method, a demand response system, and a recording medium are provided. The response control method includes: determining priorities of devices to be controlled to participate in a demand response; generating respective participation profiles for the devices based on the determined priorities; and changing the priorities of the devices included in the participation profiles, based on whether participation in the demand response according to the generated participation profiles succeeds. Therefore, the user easily participates in the demand response, and thus energy can be saved.

9 Claims, 5 Drawing Sheets

(56) References Cited

U.S. PATENT DOCUMENTS

| | | | |
|---|---|---|---|
| 2011/0106328 A1* | 5/2011 | Zhou | G05B 13/024 700/291 |
| 2011/0231320 A1* | 9/2011 | Irving | G06Q 30/00 705/80 |
| 2011/0251731 A1* | 10/2011 | Yang | H02J 3/14 700/296 |
| 2012/0232701 A1* | 9/2012 | Carty | G05B 15/02 700/277 |
| 2012/0232712 A1* | 9/2012 | Paik | H02J 3/14 700/295 |
| 2012/0330477 A1* | 12/2012 | Imahara | G06Q 50/06 700/297 |
| 2013/0193757 A1* | 8/2013 | Batzler | H02J 3/14 307/41 |
| 2013/0293009 A1* | 11/2013 | Sako | H04B 3/54 307/11 |
| 2014/0350741 A1* | 11/2014 | Takahashi | G05F 1/66 700/295 |
| 2015/0120075 A1* | 4/2015 | Le Roux | H02J 13/00002 700/296 |
| 2015/0241895 A1* | 8/2015 | Lu | G05B 15/02 700/295 |
| 2015/0276253 A1* | 10/2015 | Montalvo | G06Q 10/06 700/276 |
| 2016/0041574 A1* | 2/2016 | Maitani | G06Q 50/16 700/291 |
| 2016/0118790 A1* | 4/2016 | Imhof | H02J 3/00 700/275 |
| 2016/0181863 A1* | 6/2016 | Suman | H02J 3/00 307/23 |
| 2016/0218507 A1* | 7/2016 | Maeda | H02J 3/008 |
| 2016/0218509 A1* | 7/2016 | Paul | H02J 3/14 |
| 2016/0225006 A1* | 8/2016 | Chen | G06F 16/9535 |
| 2017/0241663 A1* | 8/2017 | Matsuoka | G05D 23/1904 |
| 2018/0191197 A1* | 7/2018 | Carr | H02J 13/0013 |

* cited by examiner

DEMAND RESPONSE SYSTEM AND METHOD FOR CONTROLLING DEVICES TO PARTICIPATE IN DEMAND RESPONSE AUTOMATICALLY

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on May 10, 2017, and assigned Ser. No. 10-2017-0057933, the entire disclosure of which is hereby incorporated by reference.

TECHNICAL FIELD OF THE INVENTION

The present disclosure relates generally to a demand response system and a method thereof, and more particularly, to a demand response system which applies automated energy management technology to achieve a target amount of reduction and to do demand management business for general households, and specifically, receives a demand response signal via a network, and automatically controls devices in a house to correspond to the received demand response signal, and a method thereof.

BACKGROUND OF THE INVENTION

An electric power system should keep the equilibrium of demand and supply. This is important in reasonably using limited energy resources. To achieve this, there is a need for managing demand, and currently, there are many researches on demand response (DR), which is a developed form of demand management.

In the middle of the day of July or August or in the cold weather, the use of electric appliances such as air conditioners or heaters abruptly increases, and the electric power reserve rate is frequently reduced to 5% or below. When the electric power reserve rate is reduced, there may be a trouble in supplying electric power even if only one or two power plants are stopped due to a breakdown or regular check. Therefore, there should be a method for increasing the electric power reserve rate to a predetermined level or higher.

In terms of demand, it may be recommended to refrain from overusing air conditioners on summer days, and campaigns for maintaining indoor temperature of houses, offices, or public facilities at an appropriate level or higher may be conducted.

As described above, in terms of demand, campaigns for reducing power consumption may be conducted for electric power consumers for a time of high demand for electric power, and incentives may be given to electric power consumers taking part in campaigns and reducing more than a predetermined amount of power consumption. These actions may be referred to as a demand response.

That is, the demand response may be defined as a change in consuming patterns caused by a change in electric power rates, and in addition, may be defined as an incentive payment to curb electric power usage when an electric power market price is high. In addition, the demand response may include an intentional process of changing electric power consuming behaviors.

Related-art demand management business aims at reducing power consumption in factories or buildings having a predetermined scale or larger, and performs passive power consumption reduction through managers, rather than performing automated demand response power consumption reduction even for utilization equipment or fixture units. Accordingly, power consumption reduction is only determined and performed by managers or users, and applications are limited to factories or buildings having a predetermined scale or larger. Therefore, there is a limit to reducing power consumption by performing demand management business, and power consumption reduction is generally determined based on a contract under a corresponding environment. Therefore, there is a limit to actively reflecting changing systems or conditions or environments of consumers.

Accordingly, there is a need for a method for easily participating in a demand response for electric power demand management.

SUMMARY OF THE INVENTION

To address the above-discussed deficiencies of the prior art, it is a primary aspect of the present disclosure to provide a demand response method, which determines priorities of devices to be controlled to participate in a demand response, generates respective participation profiles of the devices based on the determined priorities, and changes the priorities of the devices included in the participation profiles, based on success or failure of participation in the demand response according to the generated participation profiles, a demand response system, and a recording medium.

Another aspect of the present disclosure is to provide a demand response method, which determines priorities of devices to be controlled to participate in a demand response, generates respective participation profiles of the devices based on the determined priorities, identifies whether the devices accept participation in the demand response in sequence according to the priorities until a target amount of energy savings required in the demand response is satisfied, and modifies the priorities of the devices based on whether the devices accept the participation in the demand response.

According to an embodiment of the present disclosure to achieve the above-described aspects, a demand response method includes: determining priorities of devices to be controlled to participate in a demand response; generating respective participation profiles for the devices based on the determined priorities; and changing the priorities of the devices included in the participation profiles, based on whether participation in the demand response according to the generated participation profiles succeeds.

In addition, the determining the priorities may include extracting user preference profiles of the devices through machine learning by using past using histories of the plurality of devices in a specific space, and determining the priorities of the devices based on the user preference profiles.

In addition, the generating the participation profiles may include receiving outdoor temperature data, and generating the participation profiles for the devices based on the outdoor temperature data, the user preference profiles, and the determined priorities.

In addition, the changing the priorities may include, when the participation in the demand response according to the generated participation profiles succeeds, increasing the priorities of the devices included in the participation profiles by at least one step.

In addition, the changing the priorities may include, when the participation in the demand response according to the generated participation profiles fails, dropping the priorities of the devices included in the participation profiles by at least one step.

The demand response method may further include identifying whether the participation of the devices in the demand response is accepted in sequence according to the priorities until a target amount of energy savings required in the demand response is satisfied.

In addition, the demand response method may further include modifying the priorities of the devices based on whether the participation of the devices in the demand response is accepted.

In addition, the modifying the priorities may include, when a device gains an acceptance of participation, increasing the priority of the corresponding device by at least one step.

In addition, the modifying the priorities may include, when a device does not gain an acceptance of participation, dropping the priority of the corresponding device by at least one step.

According to an embodiment of the present disclosure, a computer-readable recording medium has a computer program recorded thereon to perform a demand response method, the method including: determining priorities of devices to be controlled to participate in a demand response; generating respective participation profiles for the devices based on the determined priorities; and changing the priorities of the devices included in the participation profiles, based on whether participation in the demand response according to the generated participation profiles succeeds.

According to an embodiment of the present disclosure, a demand response system includes: a controller configured to determine priorities of devices to be controlled to participate in a demand response, to generate respective participation profiles for the devices based on the determined priorities, and to change the priorities of the devices included in the participation profiles, based on whether participation in the demand response according to the generated participation profiles succeeds; and a communication unit configured to transmit control signals of the controller to the devices.

According to an embodiment of the present disclosure, a demand response method includes: determining priorities of devices to be controlled to participate in a demand response; generating respective participation profiles for the devices based on the determined priorities; identifying when participation of the devices in the demand response is accepted in sequence according to the priorities until a target amount of energy savings required in the demand response is satisfied; and modifying the priorities of the devices, based on whether the participation of the devices in the demand response is accepted.

According to various embodiments of the present disclosure, there are provided a demand response method, a demand response system, and a recording medium, and the response control method includes: determining priorities of devices to be controlled to participate in a demand response; generating respective participation profiles for the devices based on the determined priorities; and changing the priorities of the devices included in the participation profiles, based on whether participation in the demand response according to the generated participation profiles succeeds. Therefore, the user easily participates in the demand response, and thus energy can be saved.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The present disclosure will be described in more detail with reference to the accompanying drawings.

Figure 1:
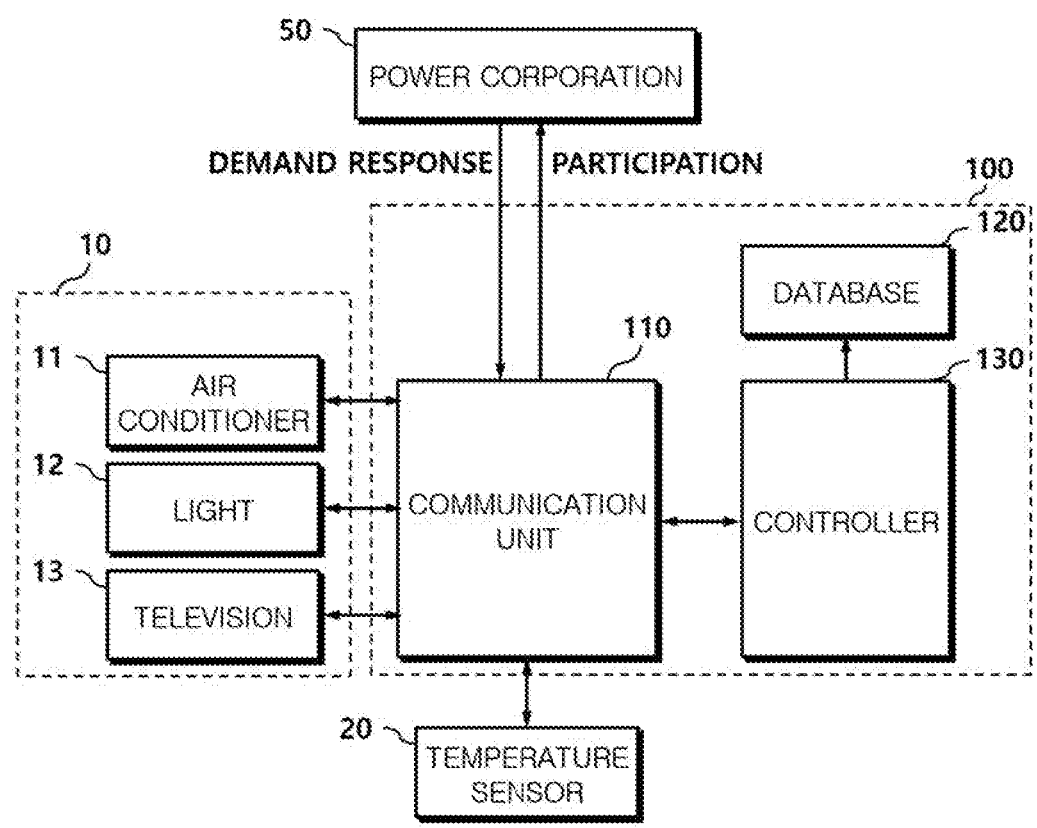
FIG. 1 is a block diagram illustrating a structure of a demand response system according to an embodiment of the present disclosure.

FIG. 1 is a block diagram illustrating a structure of a demand response system 100 according to an embodiment of the present disclosure. As shown in FIG. 1, the demand response system 100 is communicably connected with electric power consumption devices 10 included in a specific space, such as a house or a building, and controls the electric power consumption devices 10. As shown in FIG. 1, the electric power consumption devices 10 may include an air conditioner 11, a light 12, and a television 13. However, any device that consumes electric power may be included in the electric power consumption devices 10.

In addition, the demand response system 100 receives outdoor temperature data that is detected by a temperature sensor 20.

In addition, the demand response system 100 may receive a demand response signal from an electric power supply utility such as Korea Electric Power Corporation 50, and may transmit a participation signal in response thereto. Herein, the demand response signal may be a signal asking whether to participate in an electric power reduction campaign of the electric power supply utility, and the participation signal is a signal replying that the device will participate in the corresponding demand response in the house or building. Participation refers to participating in the demand response. The demand response signal may include information on a target amount of energy savings required therein, and may include a plurality of pieces of information on target amounts of energy savings required in stages. For example, the demand response signal may include information on target amounts of energy savings required in five stages in total, such as 100 watts, 200 watts, 300 watts, 400 watts, 500 watts, according to a degree of participation. A user may select a target amount of energy savings of any stage from the target amounts of power savings required in the demand response signal, and may participate in the demand response.

As described above, the demand response system 100 may be installed in one building or house, and may receive the demand response signal in the corresponding building or house and participate in the demand response, and thereby may control the electric power consumption devices 10 arranged in the house or building to participate in the demand response.

As shown in FIG. 1, the demand response system 100 includes a communication unit 110, a database 120, and a controller 130.

The communication unit 110 transmits and receives outdoor temperature data, a demand response signal, and a participation signal. Specifically, the communication unit 110 receives outdoor temperature data from the temperature sensor 20. The outdoor temperature data may include information on an outdoor temperature value during a predetermined period, and may use Celsius or Fahrenheit as a unit.

In addition, the communication unit 110 receives a demand response signal from an electric power supply utility such as Korea Electric Power Corporation 50, and transmits a corresponding participation signal.

In addition, the communication unit 110 forwards the received signals to the controller 130, and transmits a control signal generated by the controller 130 to the electric power consumption devices 10. By doing so, the controller controls the operations of the electric power consumption devices 10.

The database 120 stores various data necessary for the operation of the demand response system 100. Specifically, the database 120 stores the outdoor temperature data, the demand response signal, the participation signal, priorities of devices, user preference profiles of devices, and participation profile information of devices in the form of a database. The database 120 may store the above-described data in a predetermined period, and for example, the database 120 may store one data per one minute or may store one data per one hour.

The controller 130 controls an overall operation of the demand response system 100, and controls demand response operations of the electric power consumption devices 10. Specifically, the controller 130 may determine priorities of the devices to be controlled to participate in the demand response, may generate respective participation profiles of the devices based on the determined priorities, and may change the priorities of the devices included in the participation profiles, based on whether participation in the demand response according to the generated participation profiles succeeds.

Herein, the priority indicates a priority of participation in the demand response, given to the electric power consumption devices 10. For example, when the air conditioner 11 is given a first priority, the light 2 is given a second priority, and the television 13 is given a third priority, the controller 130 may receive, from the user, a confirmation on whether the air conditioner 11 will participate in the demand response first. However, when an amount of energy savings is not sufficient only with the participation of the air conditioner 11 or the user does not accept participation of the air conditioner 11, the controller 130 receives, from the user, a confirmation on whether the light 12 will participate in the demand response. When the amount of energy savings is not sufficient only the participation of the air conditioner 11 or the light 12, or the user does not accept the participation of the air conditioner 11 or the light 12, the controller 130 may receive, from the user, a confirmation on whether the television 13 will participate in the demand response.

The participation profile of each devices includes a control method of the electric power consumption device 10 for reducing electric power consumption to participate in the demand response, and may be a profile that includes automatic control information of each device regarding how much a using time or an intensity of use should be reduced in each electric power consumption device 10 to satisfy the target amount of power savings required in the demand response. For example, when the target amount of power savings required per one day in the demand response is 200 kW, the participation profile of each device may include automatic control information for each device, indicating that the using time of the air conditioner 11 per one day should be reduced from 10 hours to 8 hours to be reduced by two hours (50 kW*2=100 kW), and the using time of the television 13 per one day should be reduced from 10 hours to 6 hours to be reduced by four hours (25 kW*4=100 kW), and, as a result, 200 kW in total can be saved. As described above, the participation profile of each device may include automatic control information of each device for satisfying a target amount of power savings per one day, and may include automatic control information of each device for satisfying a target amount of power savings per one month.

Specifically, the controller 130 may perform methods of FIG. 2, FIG. 3, FIG. 4 and FIG. 5, which will be described below.

The demand response system 100 illustrated in FIG. 1 may be implemented as a physically independent device, or may be implemented as a portion of a certain device or system. In addition, the demand response system 100 may be implemented in the form of software, such as a program or a framework installed in a computer or a server, or an application. Each element of the demand response system 100 may be implemented as a physical element or an element having a software function.

Hereinafter, a demand response method of the demand response system 100 will be described in detail with reference to FIG. 2.

Figure 2:
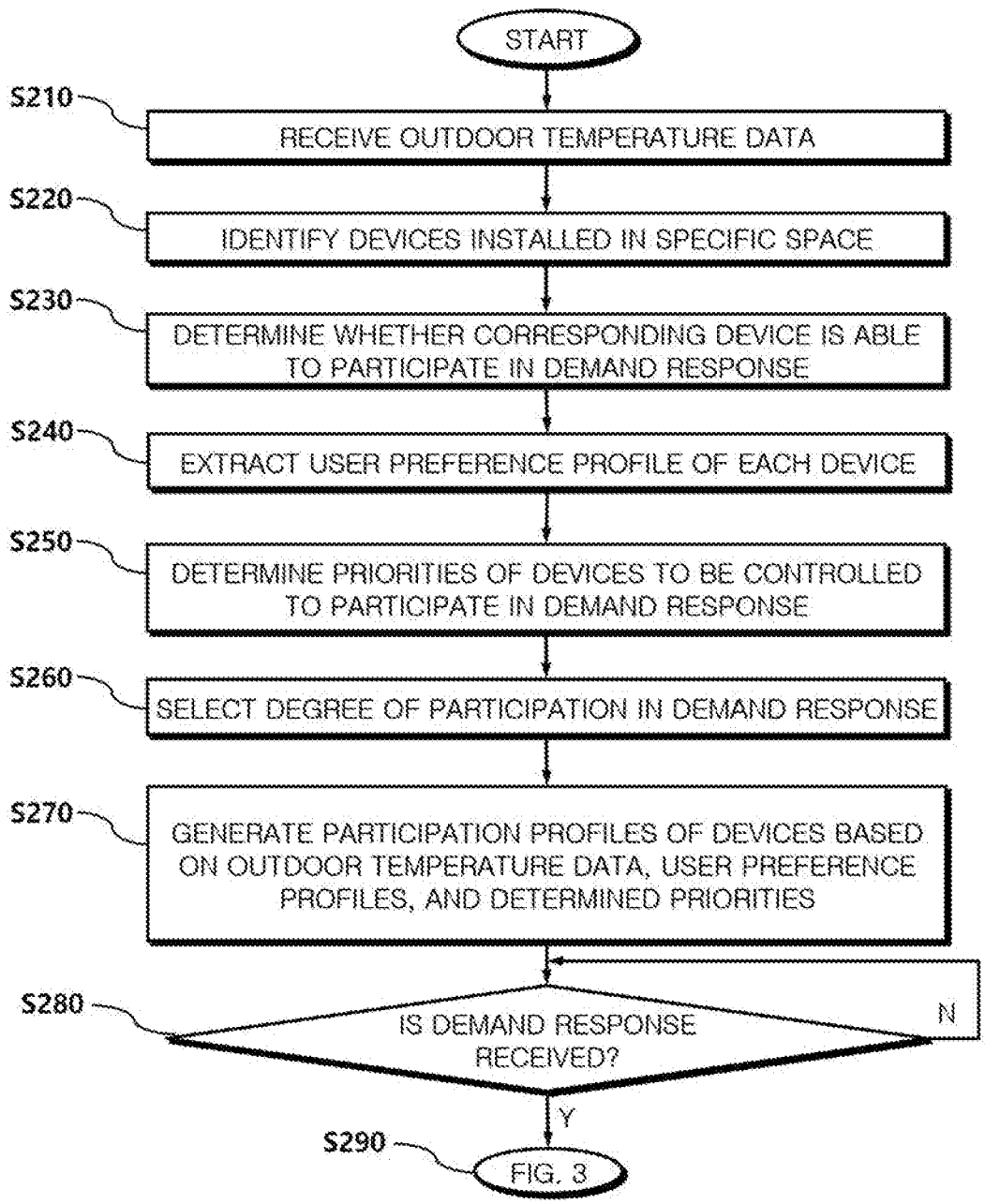
FIG. 2 is a flowchart provided to illustrate a demand response method for generating a participation profile of each device.

FIG. 2 is a flowchart provided to illustrate a demand response method for generating a participation profile of each device according to an embodiment of the present disclosure.

The demand response system 100 may receive outdoor temperature data from the temperature sensor 20 (S210). In addition, the demand response system 100 may identify the electric power consumption devices 10 installed in a specific space (S220). The demand response system 100 may determine whether each of the electric power consumption devices 10 is able to participate in a demand response (S230). For example, since a refrigerator is a device that should be always turned on, the refrigerator cannot be turned on or cannot reduce an intensity of operation to participate in the demand response. Therefore, the refrigerator is a device that is not able to participate in the demand response. However, the air conditioner 11, the light 12, and the television 13 are devices that do not cause a serious problem even when they are turned on or reduce the intensity of operation, and thus correspond to devices that are able to participate in the demand response.

In addition, the demand response system 100 may extract a user preference profile of each device through machine learning by using a past using history of each of the plurality of electric power consumption devices 10 in the specific space (S240), and may determine priorities of the devices to be controlled to participate in the demand response, based on the user preference profile (S250).

Herein, the user preference profile indicates operation pattern information of each of the electric power consumption devices 10 according to a user's tendency. For example, a certain user may have a tendency to keep the air conditioner 11 at 24 degrees centigrade when turning on the air conditioner 11, and another user may have a tendency to keep the air conditioner at 22 degrees centigrade when turning on the air conditioner. Since the user preference profile varies according to a user as described above, the demand response system 100 may extract the user preference profile through machine learning by using the past using history of the corresponding user regarding each of the electric power consumption devices 10. As described above, the demand response system 100 may enhance accuracy of the user preference profile by extracting the user preference profile through machine learning by using the past using history of the corresponding user regarding each of the electric power consumption devices 10. Herein, machine learning may apply various algorithms such as supervised learning, unsupervised learning, reinforcement learning, deep learning, or the like.

Accordingly, since the demand response system 100 extracts a user preference profile of a different configuration according to a user even with respect to the same demand response, the demand response system 100 may generate a participation profile appropriate for the user. By doing so, the demand response system 100 controls the demand response by considering a user's using pattern of the electric power consumption devices 10.

Thereafter, the demand response system 100 selects a degree of participation in the demand response (S260). The demand response may include target amounts of energy savings of various stages. For example, the demand response may include information on target amounts of energy savings required in five stages in total, such as 100 watts, 200 watts, 300 watts, 400 watts, 500 watts, according to a degree of participation. Then, the user may select a demand response participation stage as desired, and the demand response system 100 may select a degree of participation in the demand response according to the stage selected by the user.

Thereafter, the demand response system 100 generates a participation profile for each device, based on the outdoor temperature data, the user preference profile, and the determined priority (S270).

Specifically, the demand response system 100 may generate the participation profile for each device of the electric power consumption devices 10 to correspond to the outdoor temperature, based on the outdoor temperature data. For example, when the outdoor temperature is high, the demand response system 100 may generate a participation profile to reduce an electric power saving rate of the air conditioner 11, which is a cooling device, and, when the outdoor temperature is low, the demand response system 100 may generate a participation profile to increase the electric power saving rate of the air conditioner 11.

In addition, when the user prefers to operate the electric power consumption device 10 in a specific state, the demand response system 100 may generate a participation profile to operate the corresponding electric power consumption device 10 at the corresponding specific state, by using the user preference profile. For example, when the user prefers to keep the air conditioner at 22 degrees centigrade, the demand response system 100 may generate a participation profile to control the air conditioner 11 to operate at 20 degrees centigrade.

In addition, based on the determined priority, the demand response system 100 may identify whether each of the electric power consumption devices 10 participates in the demand response and may generate a participation profile of each device.

Figure 3:
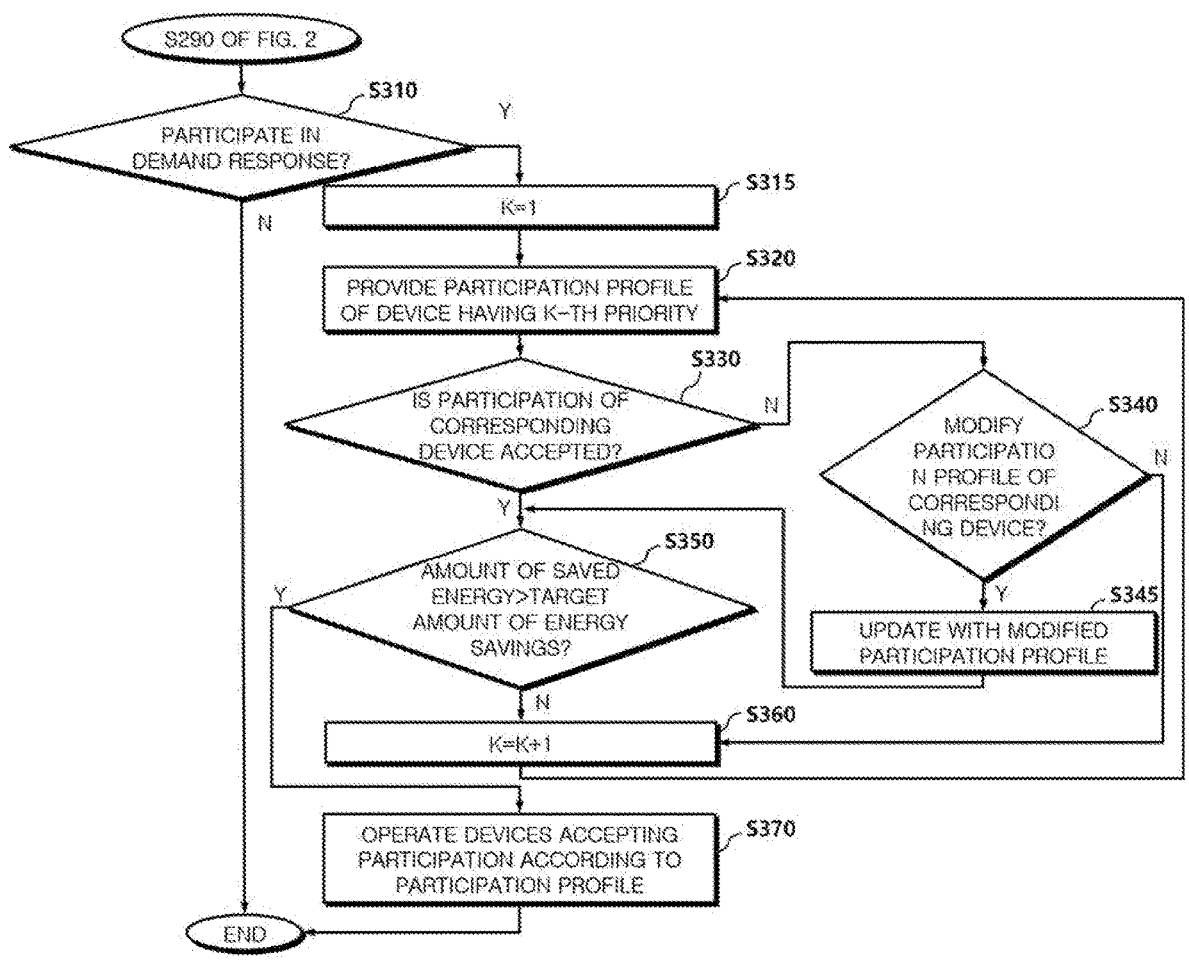
FIG. 3 is a flowchart provided to illustrate a process of participating in a demand response according to a participation profile according to an embodiment of the present disclosure.

Thereafter, the demand response system 100 may determine whether a demand response signal is received (S280), and, when the demand response signal is received (S280-Y), the demand response system 100 performs steps of FIG. 3 (S290).

Through the above-described process, the demand response system 100 may generate the participation profile by using a variety of information.

FIG. 3 is a flowchart provided to illustrate a process of participating in a demand response according to a participation profile. The demand response system 100 may determine whether each device accepts participation in the demand response in sequence according to the priority until a target amount of energy savings required in the demand response is satisfied. This will be described in detail with reference to FIG. 3.

The demand response system 100 receives, from the user, an input regarding whether to participate in the demand response (S310). When the demand response system 100 determines to participate in the demand response according to a user input (S310-Y), the demand response system 100 may initialize a K value to 1 (S315), and provides the participation profile of the electric power consumption device 10 of the K-th priority to the user (S320). In this case, the demand response system 100 may provide the participation profile of the electric power consumption device 10 of the K-th priority to the user, by displaying the participation profile on a display screen or transmitting an email or a text message.

The demand response system 100 may receive, from the user, an input regarding whether the participation of the corresponding electric power consumption device 10 is accepted (S330). When the participation of the corresponding electric power consumption device 10 is accepted (S330-Y), the demand response system 100 may calculate estimated amounts of power savings corresponding to the participation profiles of all of the participation devices including the corresponding electric power consumption device 100, and may determine whether the estimated amount of power savings exceeds the target amount of power savings (S350).

On the other hand, when the participation of the corresponding electric power consumption device 10 is not accepted (S330-N), the demand response system 100 may determine whether the participation profile of the corresponding electric power consumption device 10 is modified by the user (S340). When the participation profile of the corresponding electric power consumption device 10 is modified (S340-Y), the demand response system 100 may update the participation profile of the corresponding electric power consumption device 10 with the modified participation profile (S345). Thereafter, the demand response system 100 may calculate estimated amounts of energy savings corresponding the participation profiles of all of the participation devices including the corresponding electric power consumption device 10, and may determine whether the estimated amount of energy savings exceeds the target amount of energy savings (S350).

When the estimated amount of energy savings does not exceed the target amount of energy savings (S350-N), the target amount of energy savings required in the demand response is not satisfied, and thus the demand response system 100 may add 1 to the K value to determine whether the electric power consumption device 10 of the next priority participates in the demand response (S360), and may resume step S320.

On the other hand, when the estimated amount of energy savings exceeds the target amount of energy savings (S350-Y), the demand response system 100 may participate in the demand response by controlling the electric power consumption devices 10 accepting the participation to operate according to the participation profile, thereby saving electric power (S370).

Through the above-described process, the demand response system 100 may determine whether the participation of each device in the demand response is accepted in sequence according to the priority until the target amount of energy savings required in the demand response is satisfied, and may control the electric power consumption devices 10 to participate in the demand response and to save electric power.

Figure 4:
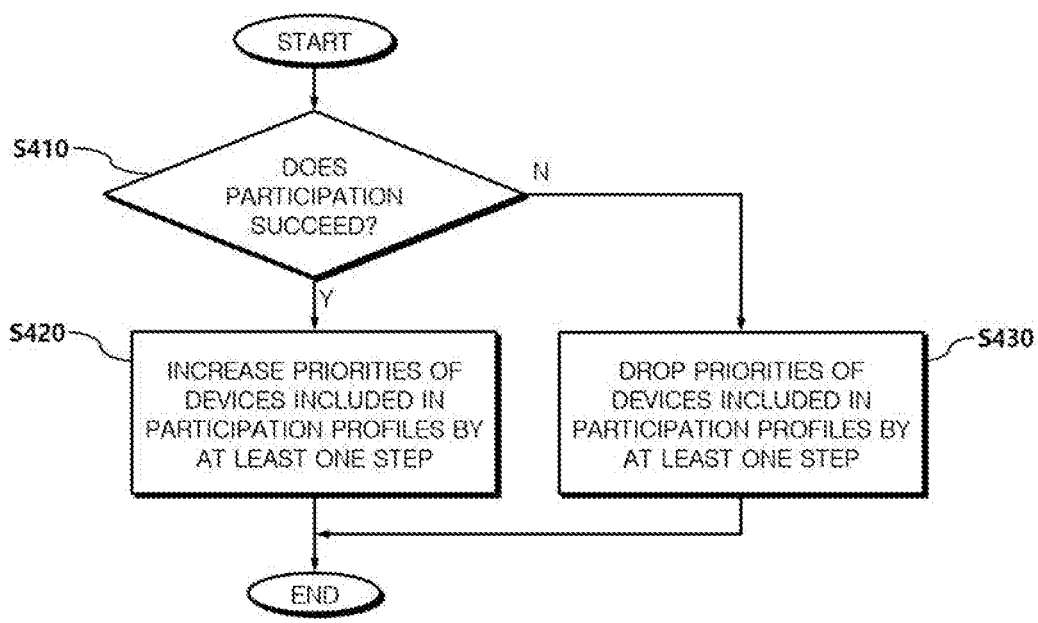
FIG. 4 is a view illustrating a process of changing a priority according to whether participation succeeds according to an embodiment of the present disclosure.

FIG. 4 is a view illustrating a process of changing a priority according to whether participation in the demand response succeeds according to an embodiment of the present disclosure. The demand response system 100 may change the priorities of the devices included in the participation profiles, based on whether the participation in the demand response according to the generated participation profile succeeds.

Herein, success in the participation refers to success in the participation in the demand response that is achieved by really reducing electric power consumption in excess of the target amount of energy savings required in the demand response, as a result of controlling the electric power consumption devices 10 according to the participation profiles. In addition, failure of the participation refers to failure of the participation in the demand response that is caused by not really reducing electric power consumption as much as the target amount of energy savings required in the demand response, as a result of controlling the electric power consumption devices 10 according to the participation profiles.

When the participation in the demand response according to the generated participation profile succeeds (S410-Y), the demand response system 100 increases the priorities of the devices included in the participation profiles by at least one step (S420). For example, when the air conditioner 11 has the first priority, the light 12 has the second priority, and the television 13 has the third priority, and the participation of the light 12 and the television 13 in the demand response succeeds, the demand response system 100 increases the priorities of the light 12 and the television 13 by one step, such that the light 12 has the first priority, the television 13 has the second priority, and the air conditioner 11 has the third priority.

On the other hand, when the participation in the demand response according to the generated participation profile fails (S410-N), the demand response system 100 may drop the priorities of the devices included in the participation profiles by at least one step (S430). For example, when the air conditioner 11 has the first priority, the light 12 has the second priority, and the television 13 has the third priority, and the participation of the air conditioner 11 and the light 12 in the demand response fails, the demand response system 100 may drop the priorities of the air conditioner 11 and the light 12 by one step, such that the television 13 has the first priority, the air conditioner 11 has the second priority, and the light 12 has the third priority.

Through the above-described process, the demand response system 100 may change the priorities of the devices included in the participation profiles, based on whether the participation in the demand response according to the generated participation profiles succeeds. Accordingly, since devices having a high participation success rate can be less used by the user, the demand response system 100 may change the priorities to control the devices having the high participation success rate to mainly participate in the demand response.

Figure 5:
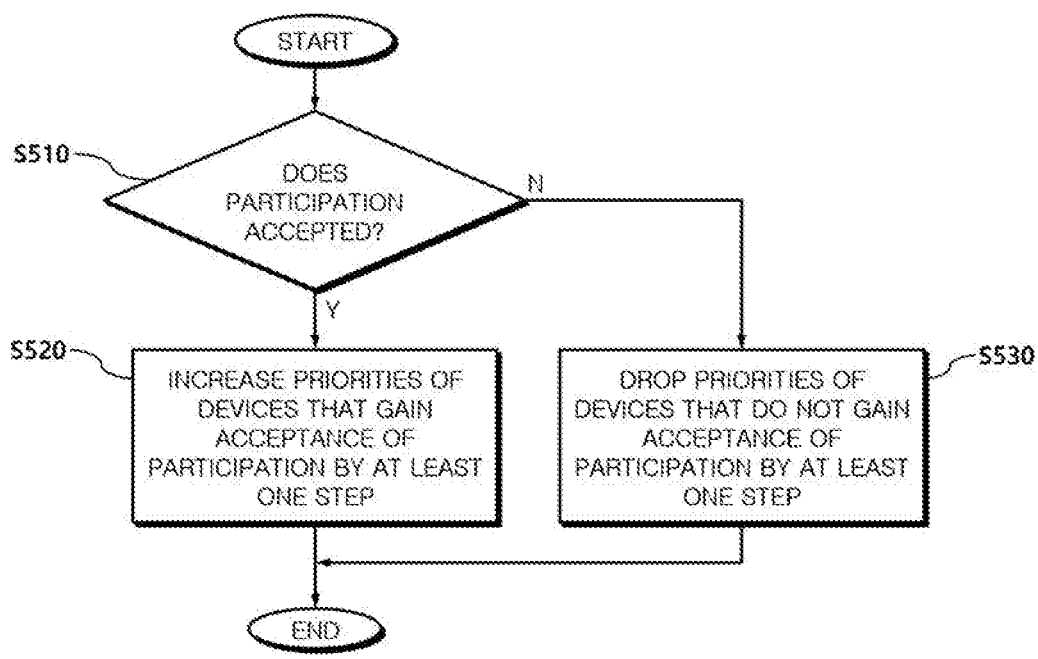
FIG. 5 is a view illustrating a process of changing a priority according to whether participation is accepted according to an embodiment of the present disclosure.

FIG. 5 is a view illustrating a process of changing a priority according to whether participation is accepted according to an embodiment of the present disclosure. The demand response system 100 may modify the priorities of the devices based on whether the participation of each device in the demand response is accepted. Herein, determining whether the participation in the demand response is accepted may correspond to step S330 of FIG. 3 of determining whether the participation is accepted. Since the acceptance of the participation means that the corresponding electric power consumption device 10 uses less power, or the user has an intention of letting the corresponding electric power consumption device 10 participate in the demand response, the electric power consumption device 10 accepting the participation is highly likely to receive acceptance of participation from the user afterward, and thus the priority should be increased.

Accordingly, when the participation of the electric power consumption device 10 in the demand response is accepted (S510-Y), the demand response system 100 increases the priority of the corresponding electric power consumption device that gains an acceptance of participation by at least one step (S520). For example, when the air conditioner 11 has the first priority, the light 12 has the second priority, and the television 13 has the third priority, and the participation of the light 12 in the demand response is accepted, the demand response system 100 increases the priority of the light 12 by one step, such that the light 12 has the first priority, the air conditioner 11 has the second priority, and the television 13 has the third priority.

On the other hand, when the participation of the electric power consumption device 10 in the demand response is not accepted (S510-N), the demand response system 100 may drop the priority of the corresponding electric power consumption device 10, which does not gain the acceptance of the participation, by at least one step (S530). The device that does not gain the acceptance of the participation is highly likely to be a device that should be continuously used by the user without power saving, and thus the priority of the participation of the corresponding device may be dropped. For example, when the air conditioner 11 has the first priority, the light 12 has the second priority, and the television 13 has the third priority, and the participation of the light 12 in the demand response is not accepted, the demand response system 100 may drop the priority of the light 12 by one step, such that the air conditioner 11 has the first priority, the television 13 has the second priority, and the light 12 has the third priority.

Through the above-described process, the demand response system 100 may modify the priorities of the devices based on whether the participation of each device in the demand response is accepted.

The technical idea of the present disclosure may be applied to a computer-readable recording medium which records a computer program for performing the function and the method of the demand response system 100 according to embodiments. In addition, the technical idea according to various embodiments of the present disclosure may be implemented in the form of a programming language code recorded on the computer-readable recording medium and readable by a computer. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, a flash memory, a solid state disk (SSD), or the like. A code or program that is stored in the computer readable recording medium and readable by a computer may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A demand response method comprising:
determining priorities of devices to be controlled to participate in a demand response;
generating respective participation profiles for the devices based on the determined priorities; and
changing the priorities of the devices included in the participation profiles, based on whether participation in the demand response according to the generated participation profiles succeeds,
wherein the determining the priorities comprises:
extracting user preference profiles of the devices through machine learning by using past using histories of the devices in a specific space, the user preference profiles comprising a first user preference profile corresponding to a first user of at least one device of the plurality of devices in the specific space and a second user preference profile corresponding to a second user of the at least one device in the specific space; and
determining the priorities of the devices based on the first user preference profile or the second user preference profile based on which of the first user or the second user is in the specific space at a time of the demand response, and
wherein generating the respective participation profiles for the devices comprises:
receiving outdoor temperature data; and
generating, for at least one of the devices, a first participation profile having a first energy savings rate based on the outdoor temperature being greater than or equal to threshold value and a second participation profile having a second energy savings rate greater than the first based on the outdoor temperature being less than the threshold value.

2. The demand response method of claim 1, wherein the changing the priorities comprises, when the participation in the demand response according to the generated participation profiles succeeds, increasing the priorities of the devices included in the participation profiles by at least one step.

3. The demand response method of claim 1, wherein the changing the priorities comprises, when the participation in the demand response according to the generated participation profiles fails, dropping the priorities of the devices included in the participation profiles by at least one step.

4. The demand response method of claim 1, further comprising identifying whether the participation of the devices in the demand response is accepted in sequence according to the priorities until a target amount of energy savings required in the demand response is satisfied.

5. The demand response method of claim 4, further comprising modifying the priorities of the devices based on whether the participation of the devices in the demand response is accepted.

6. The demand response method of claim 5, wherein the modifying the priorities comprises, when a device gains an acceptance of participation, increasing the priority of the corresponding device by at least one step.

7. The demand response method of claim 5, wherein the modifying the priorities comprises, when a device does not gain an acceptance of participation, dropping the priority of the corresponding device by at least one step.

8. A non-transitory computer-readable recording medium having a computer program recorded thereon that, when executed by a processor, cause an apparatus to perform a demand response method, the method comprising:
determining priorities of devices to be controlled to participate in a demand response;
generating respective participation profiles for the devices based on the determined priorities; and
changing the priorities of the devices included in the participation profiles, based on whether participation in the demand response according to the generated participation profiles succeeds,
wherein the determining the priorities comprises:
extracting user preference profiles of the devices through machine learning by using past using histories of the devices in a specific space, the user preference profiles comprising a first user preference profile corresponding to a first user of at least one device of the plurality of devices in the specific space and a second user preference profile corresponding to a second user of the at least one device in the specific space; and
determining the priorities of the devices based on the first user preference profile or the second user preference profile based on which of the first user or the second user is in the specific space at a time of the demand response, and
wherein generating the respective participation profiles for the devices comprises:
receiving outdoor temperature data; and
generating, for at least one of the devices, a first participation profile having a first energy savings rate based on the outdoor temperature being greater than or equal to threshold value and a second participation profile having a second energy savings rate greater than the first based on the outdoor temperature being less than the threshold value.

9. A demand response system comprising:
a controller configured to
determine priorities of devices to be controlled to participate in a demand response, extract user preference profiles of the devices through machine learning by using past using histories of the devices in a specific space, the user preference profiles comprising a first user preference profile corresponding to a first user of at least one device of the plurality of devices in the specific space and a second user preference profile corresponding to a second user of the at least one device in the specific space, generate respective participation profiles for the devices based on the determined priorities, and change the priorities of the devices included in the participation profiles, based on whether participation in the demand response according to the generated participation profiles succeeds; and a communication unit configured to transmit control signals of the controller to the devices, wherein the controller determines the priorities of the devices based on the first user preference profile or the second user preference profile based on which of the first user or the second user is in the specific space at a time of the demand response, and wherein generating the respective participation profiles for the devices comprises:

receiving outdoor temperature data; and generating, for at least one of the devices, a first participation profile having a first energy savings rate based on the outdoor temperature being greater than or equal to threshold value and a second participation profile having a second energy savings rate greater than the first based on the outdoor temperature being less than the threshold value.

* * * * *